(12) United States Patent
Noguchi et al.

(10) Patent No.: US 7,113,118 B2
(45) Date of Patent: Sep. 26, 2006

(54) DIGITAL SIGNAL ENCODING APPARATUS AND METHOD, DIGITAL SIGNAL DECODING APPARATUS AND METHOD, AND DIGITAL SIGNAL TRANSMISSION SYSTEM

(75) Inventors: Masayoshi Noguchi, Chiba (JP); Gen Ichimura, Tokyo (JP)

(73) Assignee: Sony Corporation, (JP)

( * ) Notice: Subject to any disclaimer, the term of this patent is extended or adjusted under 35 U.S.C. 154(b) by 844 days.

(21) Appl. No.: 10/088,179

(22) PCT Filed: Jul. 19, 2001

(86) PCT No.: PCT/JP01/06305

§ 371 (c)(1),
(2), (4) Date: Jul. 1, 2002

(87) PCT Pub. No.: WO02/07321

PCT Pub. Date: Jan. 24, 2002

(65) Prior Publication Data

US 2002/0171501 A1    Nov. 21, 2002

(30) Foreign Application Priority Data

Jul. 19, 2000    (JP)    ............................ 2000-219507

(51) Int. Cl.
H03M 3/00    (2006.01)
H04B 14/06    (2006.01)

(52) U.S. Cl. ...................................... 341/143; 375/247

(58) Field of Classification Search ................ 375/260, 375/308; 341/143, 141; 381/1; 380/54, 380/51, 4, 203, 59; 382/238, 100; 700/94, 700/39, 110, 123, 47, 48; 714/718, 719, 714/725, 762; 332/112; 369/59.23, 47.19, 369/59.1, 0.26; 360/32; 371/37.01, 21.1, 371/0.2, 39.1

See application file for complete search history.

(56) References Cited

U.S. PATENT DOCUMENTS

| | | | | |
|---|---|---|---|---|
| 5,319,735 A | | 6/1994 | Preuss et al. | ............... 395/2.14 |
| 5,574,453 A | * | 11/1996 | Nishio et al. | ............... 341/143 |
| 5,835,042 A | * | 11/1998 | Ichimura et al. | ............ 341/143 |
| 6,507,299 B1 | * | 1/2003 | Nuijten | ....................... 341/143 |
| 6,574,349 B1 | * | 6/2003 | Linnartz et al. | ............ 382/100 |
| 6,574,543 B1 | * | 6/2003 | Ikeda | ........................... 701/95 |

FOREIGN PATENT DOCUMENTS

| | | |
|---|---|---|
| JP | 10233687 | 9/1998 |
| WO | WO0030101 | 5/2000 |

* cited by examiner

*Primary Examiner*—Jay K. Patel
*Assistant Examiner*—Sophia Vlahos
(74) *Attorney, Agent, or Firm*—Lerner, David, Littenberg, Krumholz & Mentlik, LLP

(57) ABSTRACT

A signal encoding apparatus encodes one-bit signals of a plurality of n channels in a delta-sigma manner. The apparatus includes a phase modulator for phase-modulating the one-bit signals as original signals to add data of inverted phases to the one-bit signals. Information data related to the one-bit signals are added to the phase-modulated one-bit signal by rearranging the data of inverted phases based on a plurality of m channel units of the n channels, where $n \geq m \geq 2$ and by exclusive ORing the information data and the phase-modulated one-bit signal data.

12 Claims, 10 Drawing Sheets

FIG.3

DIGITAL SIGNAL ENCODING APPARATUS AND METHOD, DIGITAL SIGNAL DECODING APPARATUS AND METHOD, AND DIGITAL SIGNAL TRANSMISSION SYSTEM

TECHNICAL FIELD

The present invention relates to a digital signal encoding apparatus and method for encoding one-bit signals which are modulated in the delta-sigma manner, a digital signal decoding apparatus and method for decoding the encoded signals which are encoded by the digital signal encoding apparatus and method, and a digital signal transmitting system.

BACKGROUND ART

The data format of high speed one-bit audio signals which are modulated in the $\Delta\Sigma$ manner has an extremely high sampling frequency of 64 times 44.1 kHz and a short data word length of one bit, as compared with that of the conventional digital audio signals which has a sampling frequency of 44.1 kHz and a data word length of 16 bits. Thus, by employing the high speed one-bit audio signals, a broad transmittable frequency band can be obtained. Even though the data word of the high speed one-bit audio signals modulated in the $\Delta\Sigma$ manner is one-bit, by employing the signals, a high dynamic range can be secured in the audio band which is low against the over sampling frequency of 64 times the sampling frequency. These characteristics can be applied to data recording and data transmission maintaining high tone quality.

The $\Delta\Sigma$ modulation itself is not a new technique, and conventionally the $\Delta\Sigma$ modulating circuit is often used in an A/D converter, since the circuit can suitably be configured in the form of an IC, and A/D conversion with high accuracy can be performed without difficulty.

The $\Delta\Sigma$-modulated signals or signals which are modulated in the $\Delta\Sigma$ manner can be restored to original analog signals by causing the $\Delta\Sigma$-modulated signals to pass through an analog low-pass filter of simple configuration.

In transmitting the one-bit $\Delta\Sigma$-modulated audio signals, there arise radiation noises due to a transmission line or a transmission circuit, and the generated radiation noises break into an analog audio unit and has a bad effect thereon. In order to solve the problem, the applicant of the present invention proposed a phase modulating method in "Signal Transmitting Apparatus and Method" disclosed in Japanese Laying-Open Patent H-9-186728, in which transmission signals and signals of inverted phases or signals whose phases are opposite to those of the transmission signals are alternately transmitted at a double transmission rate. In employing the phase modulating method, analog audio signals which are sufficiently low against the transmission rate are canceled by those of inverted phases, and the analog audio signals are sufficiently suppressed to low level.

When transmitting the one-bit $\Delta\Sigma$-modulated audio signals, a transmission method is desired which can transmit music signals as original signals as well as information data such as data character.

When transmitting the music signals and information data added thereto, the transmission rate is desired to be integer multiple of that of the music signals due to the facility of the processing. Thus, data to be transmitted becomes at least double in amount, and finally a quadruple transmission rate is undesirably required since signals of inverted phases are added thereto.

DISCLOSURE OF THE INVENTION

Accordingly, the present invention has an object to overcome the above-mentioned drawbacks of the prior art by providing a digital signal encoding apparatus and method, a digital signal decoding apparatus and method, and a digital signal transmitting system, which can enable transmission of digital signals maintaining high signal quality with its transmission rate and audio signal band components suppressed in transmitting one-bit $\Delta\Sigma$-modulated audio signals and information data added thereto.

The above object can be attained by providing a digital signal encoding apparatus for encoding one-bit signals of a plurality of n ($n \geq 2$) channels, the one-bit signals being modulated in the delta-sigma manner including means for phase-modulating the one-bit signals as original signals to add data of inverted phases thereto and means for adding information data which is related with the one-bit signals to the phase-modulated one-bit signal data having the data of inverted phases added thereto by rearranging the data of inverted phases on the basis of a plurality of m ($n \geq m \geq 2$) channel unit of the n channels.

According to the present invention, the information data can be added to the phase-modulated one-bit signal data with data to be transmitted unchanged in amount and with audio signal band components suppressed by rearranging the data of inverted phases of the phase-modulated one-bit signal data.

The digital signal encoding apparatus further includes synchronization signal adding means for adding independent synchronization patterns which cannot exist in the phase-modulating means or in the information data adding means by arranging a region of a plurality of samples other than a region to which the information data is added in the phase-modulated one-bit signal data every predetermined period, and converting the data of inverted phases in the region in accordance with the phase-modulated one-bit signal data.

Thus, the synchronization patterns which cannot exist in phase-modulated one-bit signal data can be added by rearranging the data of inverted phases of the phase-modulated one-bit signal data and arranging the synchronization patterns in the phase-modulated one-bit signal data periodically. So, the synchronization signals can be self-extracted by a digital signal decoding apparatus to be described later, and the original signal data and information data can be decoded from the phase-modulated one-bit signal data with its data of inverted phases rearranged.

Also the above object can be attained by providing a digital signal encoding method for encoding one-bit signals of a plurality of n ($n \geq 2$) channels, the one-bit signals being modulated in the delta-sigma manner, including the steps of phase-modulating the one-bit signals as original signals to add data of inverted phases thereto, adding information data which is related with the one-bit signals to the phase-modulated one-bit signal data having the data of inverted phases added thereto by rearranging the data of inverted phases on the basis of a plurality of m ($n \geq m \geq 2$) channel unit of the n channels, adding independent synchronization patterns which cannot exist in the phase-modulating step or in the information data adding step by arranging a region of a plurality of samples other than a region to which the information data is added in the phase-modulated one-bit signal data every predetermined period, and converting the data of inverted phases in the region in accordance with the phase-modulated one-bit signal data, and making the numbers of one-bit data [1]s and one-bit data [0]s in the predetermined period, which are generated when the synchronization patterns are added by the synchronization signal adding step, equal to each other by converting the data of inverted phases in a region of the predetermined period so that the difference between the numbers of [1]s and [0]s becomes zero.

Also the above object can be attained by providing a digital signal decoding apparatus for decoding a one-bit data stream transmitted from a digital signal encoding apparatus which phase-modulates one-bit signals as original signals of a plurality of n (n≧2) channels to add data of inverted phases thereto, the one-bit signals being modulated in the delta-sigma manner, and adds information data which is related with the one-bit signals to the phase-modulated one-bit signal data having the data of inverted phases added thereto by rearranging the data of inverted phases on the basis of a plurality of m (n≧m≧2) channel unit of the n channels to generate the one-bit data stream including synchronization signal detecting means for self-extracting synchronization signals by detecting independent synchronization patterns which cannot exist in the phase-modulating processing or in the information data adding processing, and are added by arranging a region of a plurality of samples other than a region to which the information data is added in the one-bit data stream every predetermined period and converting the data of inverted phases in the region in accordance with the phase-modulated one-bit signal data, means for detecting the information data by judging the insertion positions of the data of inverted phases in the one-bit data stream based on the synchronization signals detected by the synchronization signal detecting means, and means for judging original signal data in the one-bit data stream based on the synchronization signals detected by the synchronization signal detecting means, and detecting the original signal data from leading data of each channel every 2n samples.

Also the above object can be attained by providing a digital signal decoding method for decoding a one-bit data stream transmitted from a digital signal encoding apparatus which phase-modulates one-bit signals as original signals of a plurality of n (n≧2) channels to add data of inverted phases thereto, the one-bit signals being modulated in the delta-sigma manner, and adds information data which is related with the one-bit signals to the phase-modulated one-bit signal data having the data of inverted phases added thereto by rearranging the data of inverted phases on the basis of a plurality of m (n≧m≧2) channel unit of the n channels to generate the one-bit data stream, including the steps of self-extracting synchronization signals by detecting independent synchronization patterns which cannot exist in the phase-modulating processing or in the information data adding processing and are added by arranging a region of a plurality of samples other than a region to which the information data is added in the one-bit data stream every predetermined period and converting the data of inverted phases in the region in accordance with the phase-modulated one-bit signal data, detecting the information data by judging the insertion positions of the data of inverted phases in the one-bit data stream transmitted from a digital signal encoding apparatus based on the synchronization signals detected by the synchronization signal detecting step, and judging original signal data in the one-bit data stream transmitted from a digital signal encoding apparatus based on the synchronization signals detected by the synchronization signal detecting step and detecting the original signal data from leading data of each channel every 2n samples.

Also the above object can be attained by providing a digital signal transmitting system including a digital signal encoding apparatus which phase-modulates one-bit signals as original signals of a plurality of n (n≧2) channels to add data of inverted phases thereto, the one-bit signals being modulated in the delta-sigma manner, and adds information data which is related with the one-bit signals to the phase-modulated one-bit signal data having the data of inverted phases added thereto by rearranging the data of inverted phases on the basis of a plurality of m (n≧m≧2) channel unit of the n channels to generate a one-bit data stream, and a digital signal decoding apparatus which self-extracts synchronization signals by detecting independent synchronization patterns included in the one-bit data stream, which cannot exist in the phase-modulating processing or in the information data adding processing, and detects the information data by judging the insertion positions of the data of inverted phases in the one-bit data stream based on the synchronization signals, and judges original signal data in the one-bit data stream based on the synchronization signals and detects the original signal data from leading data of each channel every 2n samples.

These objects and other objects, features and advantages of the present invention will become more apparent from the following detailed description of the preferred embodiments of the present invention.

BRIEF DESCRIPTION OF THE DRAWINGS

FIG. 3 shows a specific example of a SYNC pattern region of the frame shown in FIG. 2.

BEST MODE FOR CARRYING OUT THE INVENTION

Figure 1:
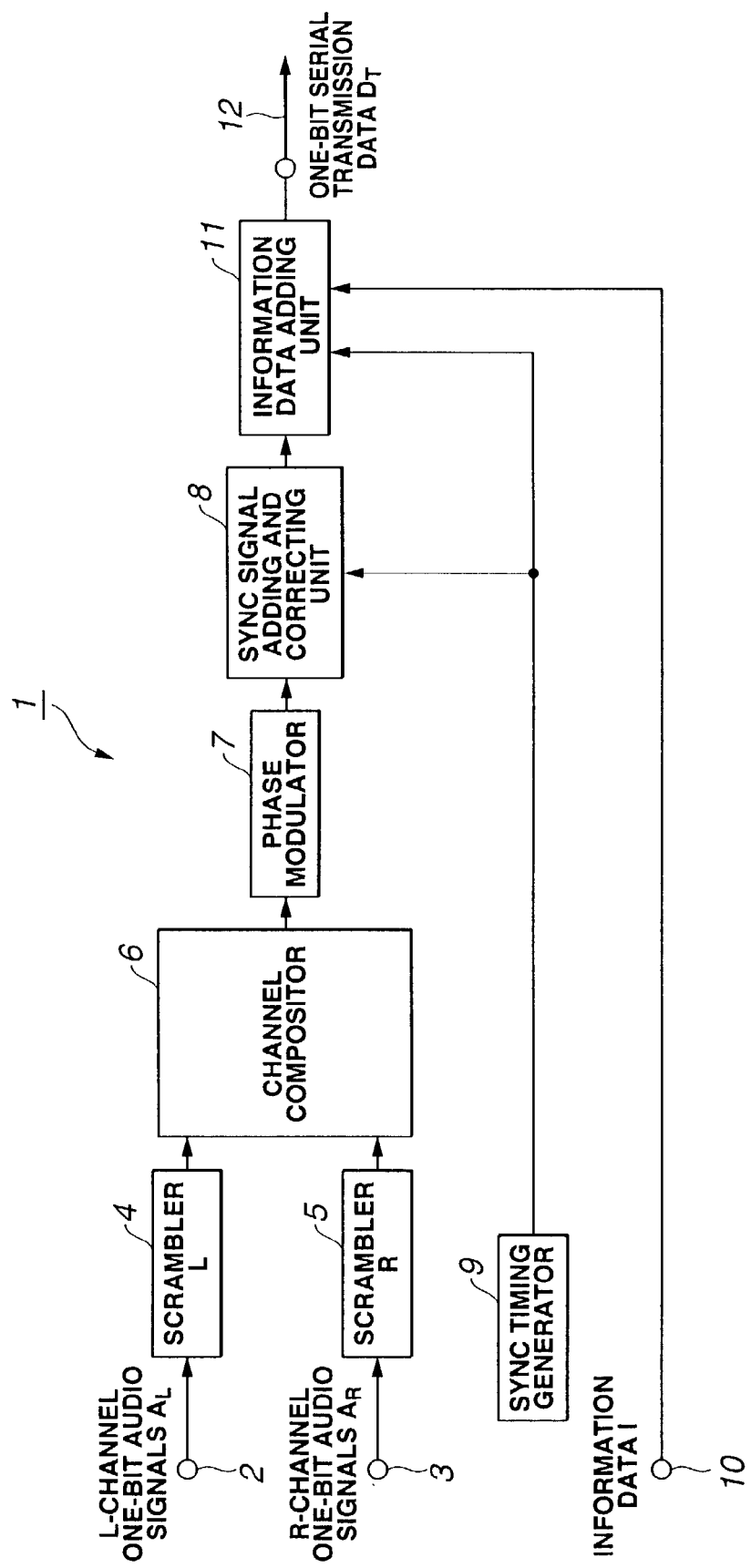
FIG. 1 shows a block diagram of a digital I/O encoder employing the digital signal encoding apparatus according to the present invention.

The present invention will further be described below concerning the best modes with reference to the accompanying drawings. Firstly, the digital signal encoding apparatus and method according to the present invention will be described. The digital signal encoding apparatus encodes one-bit audio signals of two or L and R channels obtained by performing ΔΣ modulation, and is configured as a digital I/O encoder 1 shown in FIG. 1.

The digital I/O encoder 1 includes a phase modulator 7 for phase-modulating one-bit audio signals, and an information data adding unit 11 for adding information data which is related with the one-bit audio signals to phase-modulated one-bit audio signal data by rearranging data of inverted phases thereof, or data whose phases are opposite to those of one-bit audio signal data which is to be phase-modulated, on the basis of two channel unit.

The digital I/O encoder 1 further includes a scrambler L 4 for scrambling L-channel one-bit audio signals $A_L$ supplied from an input terminal 2, a scrambler R 5 for scrambling R-channel one-bit audio signals $A_R$ supplied from an input terminal 3, and a channel compositor 6 for compositing scrambled data supplied from the scrambler L 4 and scrambled data supplied from the scrambler R 5. The phase modulator 7 phase-modulates composited data supplied from the channel compositor 6.

The digital I/O encoder 1 further includes a SYNC signal adding and correcting unit 8 between the phase modulator 7 and the information data adding unit 11. The SYNC signal adding and correcting unit 8 receives SYNC timing signals generated at and supplied from a SYNC timing generator 9, and inserts SYNC signals into the phase-modulated one-bit audio signal data supplied from the phase modulator 7 to generate SYNC patterns and correct the SYNC patterns.

So as to add the information data to the one-bit audio signal data, after the scrambler L 4 scrambles the L-channel one-bit audio signals $A_L$ and the scrambler R 5 scrambles the R-channel one-bit audio signals $A_R$, the channel compositor 6 and phase modulator 7 generate the phase-modulated one-bit audio signal data or stereo one-bit audio signal data of alternate L and R channels in which phases are inverted every one-bit data.

The information data which is related with the one-bit audio signals is data concerning the characteristics of the audio signals etc, that is, auxiliary data of the audio signals and copyright protecting information. In the present invention, the information data, which is represented by [0]s and [1]s, is added to the one-bit audio signal data by rearranging the above-described data of inverted phases.

Figure 2:
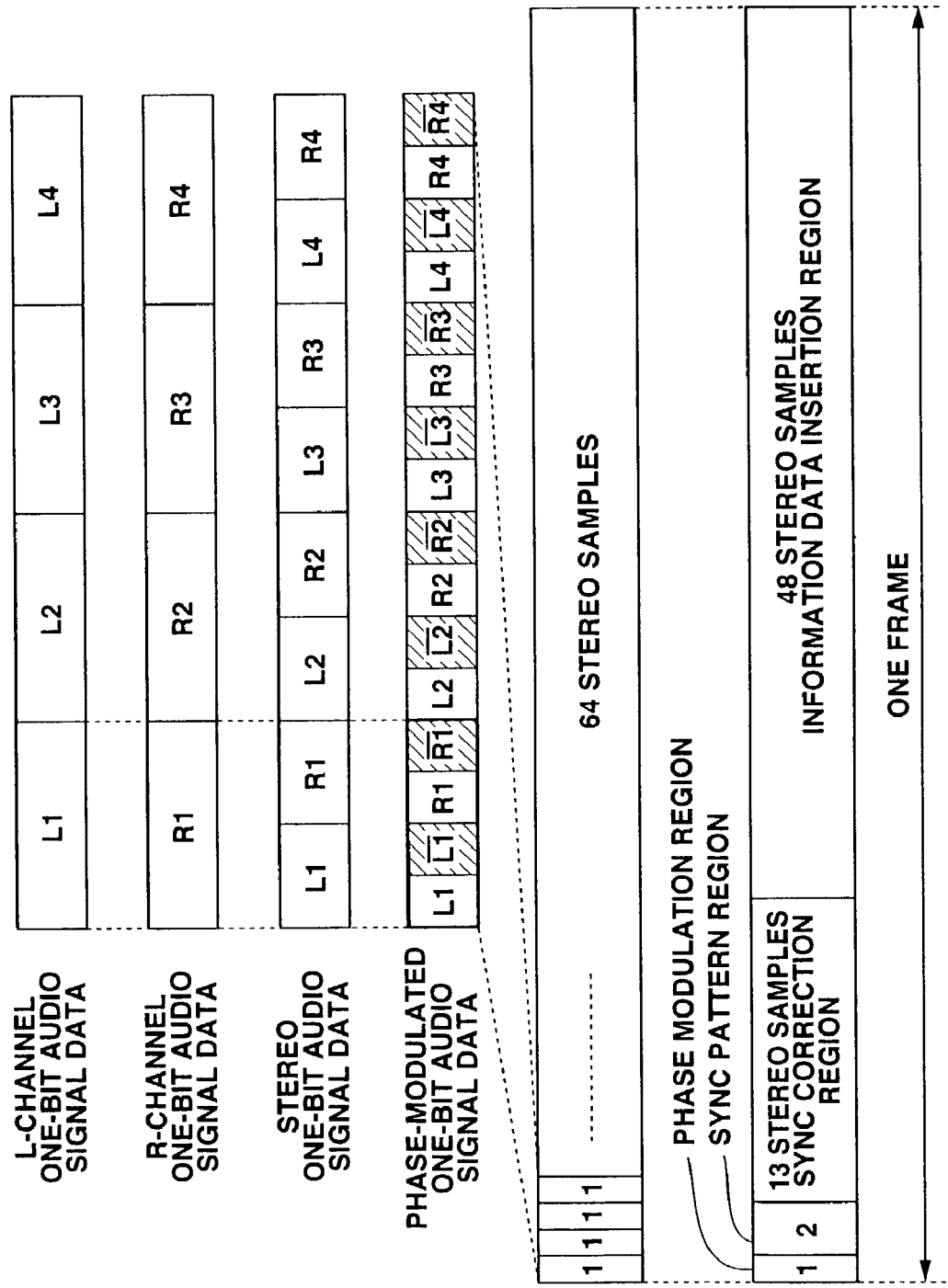
FIG. 2 shows a configuration of a serial transmission data frame output from the digital I/O encoder shown in FIG. 1.

FIG. 2 shows a configuration of the phase-modulated one-bit audio signal data supplied from the phase modulator 7 via the channel compositor 6, and a serial transmission data frame or a one-bit data stream to be transmitted by serial data transmission which is output from the digital I/O encoder 1. In this case, two channels are used to generate stereo audio signal data. After being scrambled by the scrambler L 4 and scrambler R 5, L-channel one-bit audio signal data L1, L2, L3, . . . and R-channel one-bit audio signal data R1, R2, R3 . . . are then alternatively composited by the channel compositor 6 to be a stereo one-bit data stream L1, R1, L2, R2, L3, R3, . . . . Then, the stereo one-bit audio signal data is phase-modulated by the phase modulator 7 to be a stereo one-bit data stream L1, XL1, R1, XR1, L2, XL2, R2, XR2, L3, . . . , in which phases are inverted every one-bit data. This stereo one-bit data stream is equal to the data stream in which the L-channel one-bit audio signals and R-channel one-bit audio signals are phase-modulated, and the phase-modulated data is composited alternatively every phase modulation unit. The set of four-bit data "L1, XL1, R1, XR1" is a unit termed one stereo sample, and the set of 64 stereo samples is termed one frame. One frame is composed of a phase modulation region (one stereo sample), a SYNC pattern region (two stereo samples), a SYNC correction region (13 stereo samples), and an information data insertion region (48 stereo samples), and data of inverted phases in the regions other than the phase modulation region will further be converted.

Next, the SYNC signal adding and correcting unit 8 receives SYNC timing signals generated at and supplied from the SYNC timing generator 9, and inserts the SYNC patterns into the phase-modulated one-bit audio signal data every one frame period, which will be described later.

Figure 3:
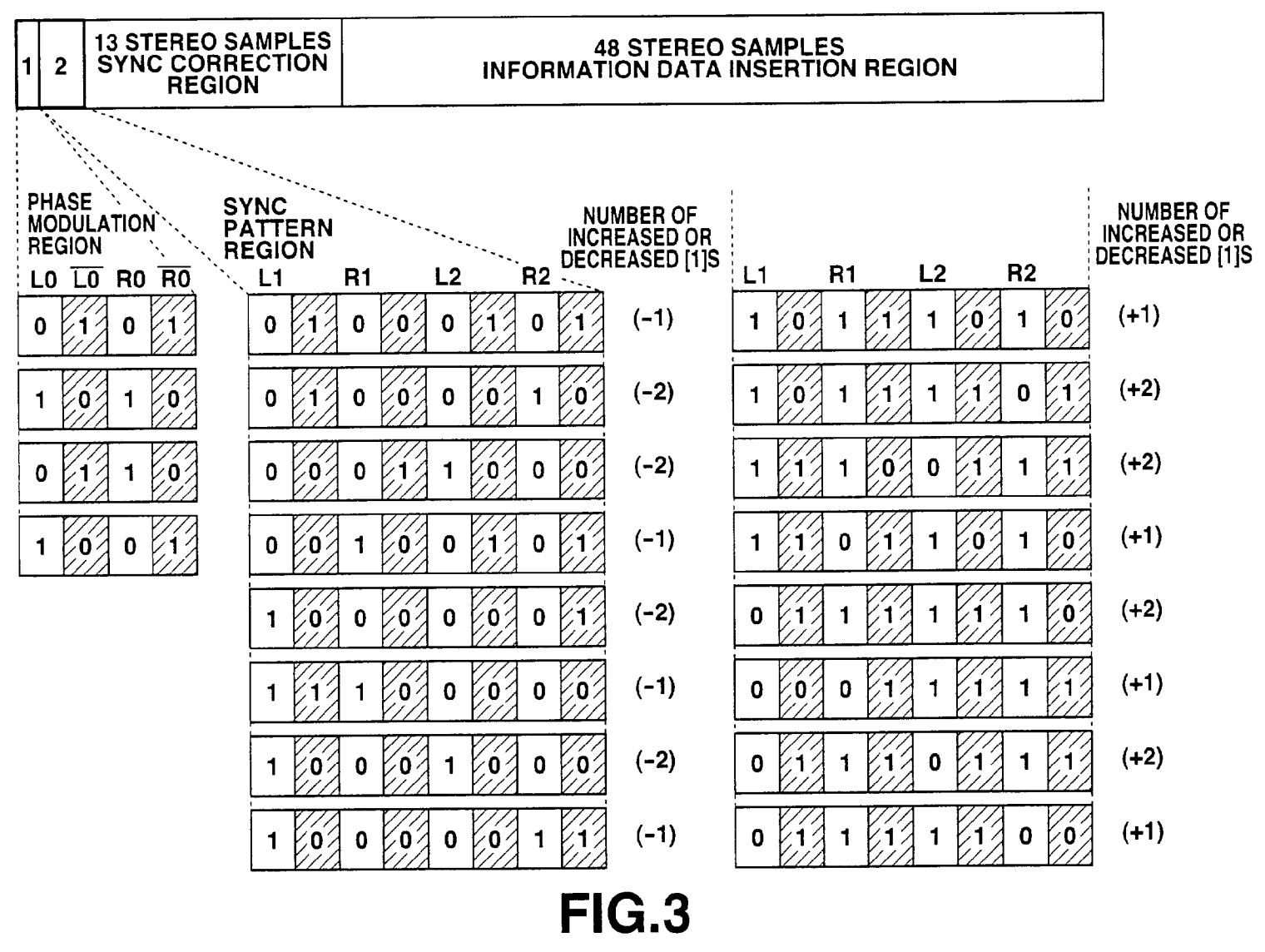

FIG. 3 shows a specific example of the phase modulation region and SYNC pattern region of the frame shown in FIG. 2. The first sample or phase modulation region has data which is phase-modulated and remains intact, and data of inverted phases XL0 and XR0 is determined by audio signal data L0 and R0. As shown, the SYNC pattern region has data of two stereo sample units, and is converted to 16 kinds of SYNC pattern data corresponding to 16 combinations of four-bit data L1, R1, L2, R2. The 16 kinds of SYNC pattern data is of independent synchronization patterns which cannot exist as the phase-modulated data or the information data. When the independent synchronization patterns are detected, the leading portion of the frame shown in FIG. 2 can be detected by a digital signal decoding apparatus, which will be described later.

Figure 4:
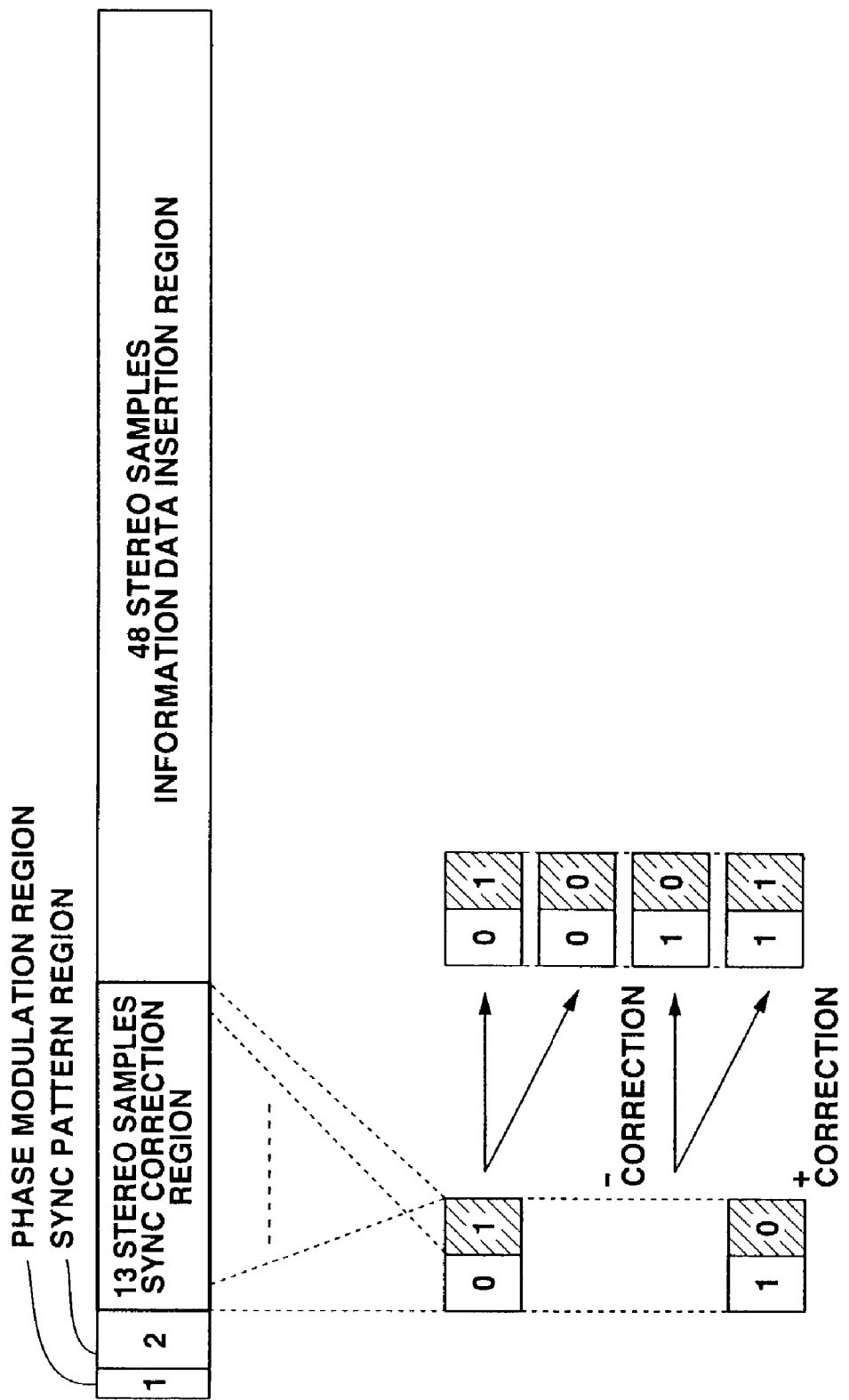
FIG. 4 shows a specific example of correction processing in a SYNC correction region of the frame shown in FIG. 2.

The SYNC signal adding and correcting unit 8 performs SYNC correction for the SYNC pattern data, which processing will be described hereinafter. FIG. 4 shows a specific example of the correction processing in the SYNC correction region of the frame shown in FIG. 2. In each of the 16 kinds of SYNC pattern data or each eight data shown in FIG. 3, the number of [0]s is not equal to that of [1]s. It is assumed that the number of increased or decreased [1]s is ((the number of [1]s)—(the number of [0]s))/2. In this case, the number of increased or decreased [1]s is +2~−2. The SYNC correction region is a region for adjusting the numbers of [1]s and [0]s. That is, the SYNC correction region is a region in which the numbers of [1]s and [0]s are corrected so that the numbers of [1]s and [0]s in the region (60 data in all) combining the SYNC pattern region and the SYNC correction region are equal to each other.

Figure 5:
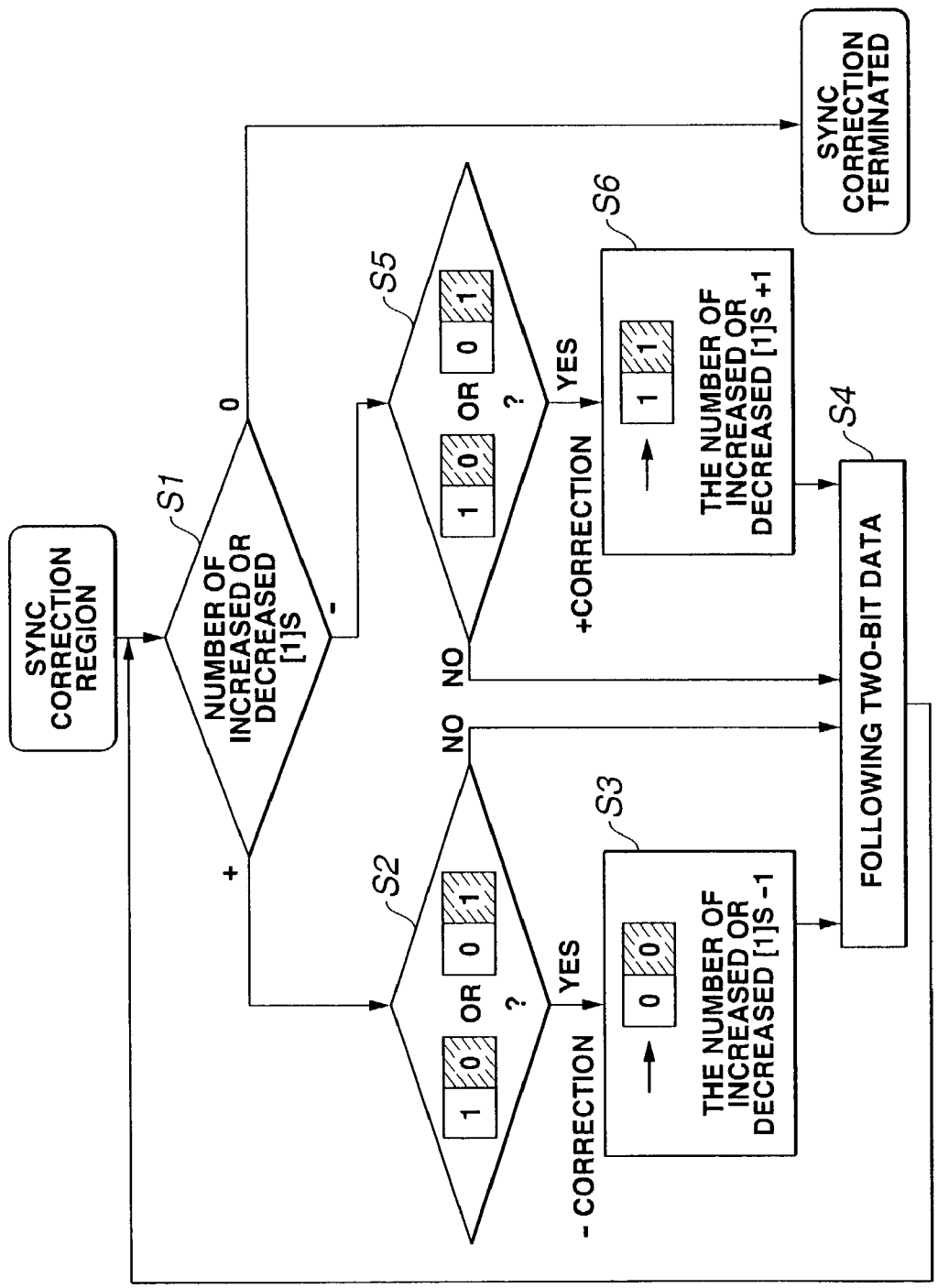
FIG. 5 shows a flow chart for implementing SYNC correction in the SYNC correction region of the frame shown in FIG. 2.

FIG. 5 shows a flow chart for implementing an algorithm of the SYNC correction which will be performed by the SYNC signal adding and correcting unit 8. At first, at step S1, in case it is determined that the sign of the number of increased or decreased [1]s is +, next at step S2, it is judged whether two-bit data is [1, 0] or [0, 1] from the leading portion of the SYNC patterns. At step S2, in case it is determined that the two-bit data is [1, 0] or [0, 1] (YES), next at step S3, —correction is performed in the SYNC correction region. That is, when the signal data is [0], the phase-modulated data becomes [0, 1], and by converting the data [0, 1] to [0, 0], the number of increased or decreased [1]s decreases by 1. Next at step S4, this processing will be performed for the following two-bit data, returning to step S1. On the other hand, at step S2, in case it is determined that the two-bit data is not [1, 0] nor [0, 1] (NO), the processing proceeds to step S4.

On the other hand, at step S1, in case it is determined that the sign of the number of increased or decreased [1]s is−, next at step S5, it is judged whether two-bit data is [1, 0] or [0, 1] from the leading portion of the SYNC patterns. At step S5, in case it is determined that the two-bit data is [1, 0] or [0, 1] (YES), next at step S6, + correction is performed in the SYNC correction region. That is, when the signal data is [1], the phase-modulated data becomes [1, 0], and by converting the data [1, 0] to [1, 1], the number of increased or decreased [1]s increases by 1. Next at step S4, this processing will be performed for the following two-bit data, returning to step S1. On the other hand, at step S5, in case it is determined that the two-bit data is not [1, 0] nor [0, 1] (NO), the processing proceeds to step S4.

In the SYNC correction region, this processing is repeatedly performed for each phase modulation unit until the number of increased or decreased [1]s is caused to be 0, that is, until it is determined that the sign of the number of increased or decreased [1]s is 0 at step S1. Then, the SYNC correction is terminated.

The information data adding unit 11 distributes information data I supplied from an input terminal 10 corresponding to the SYNC timing signals supplied from the SYNC timing generator 9, and inserts the distributed information data I into the information data insertion region of the one-bit data stream supplied from the SYNC signal adding and correcting unit 8 to generate serial transmission data $D_T$.

Figure 6:
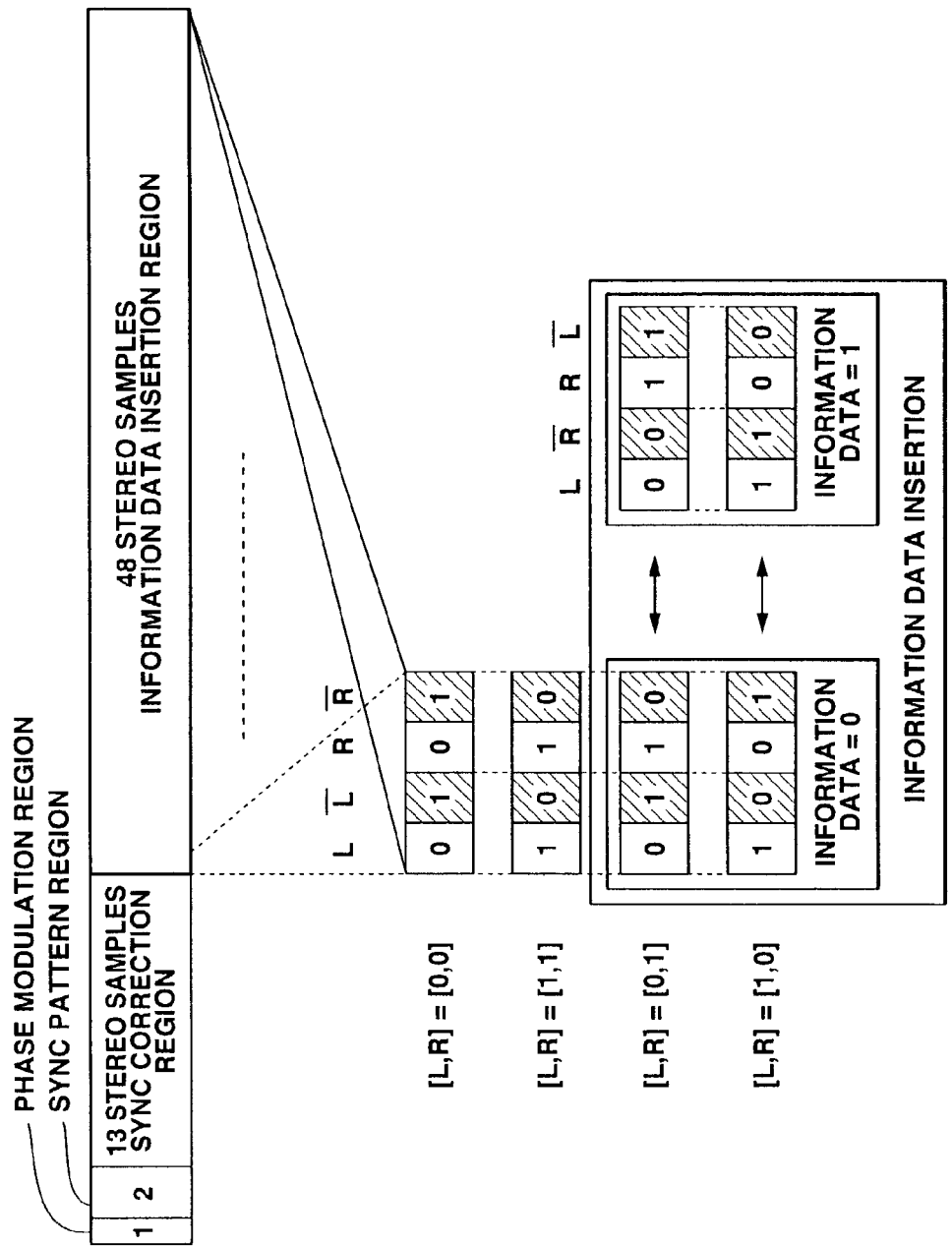
FIG. 6 shows a specific example of insertion processing in an information data insertion region of the frame shown in FIG. 2.
Figure 7:
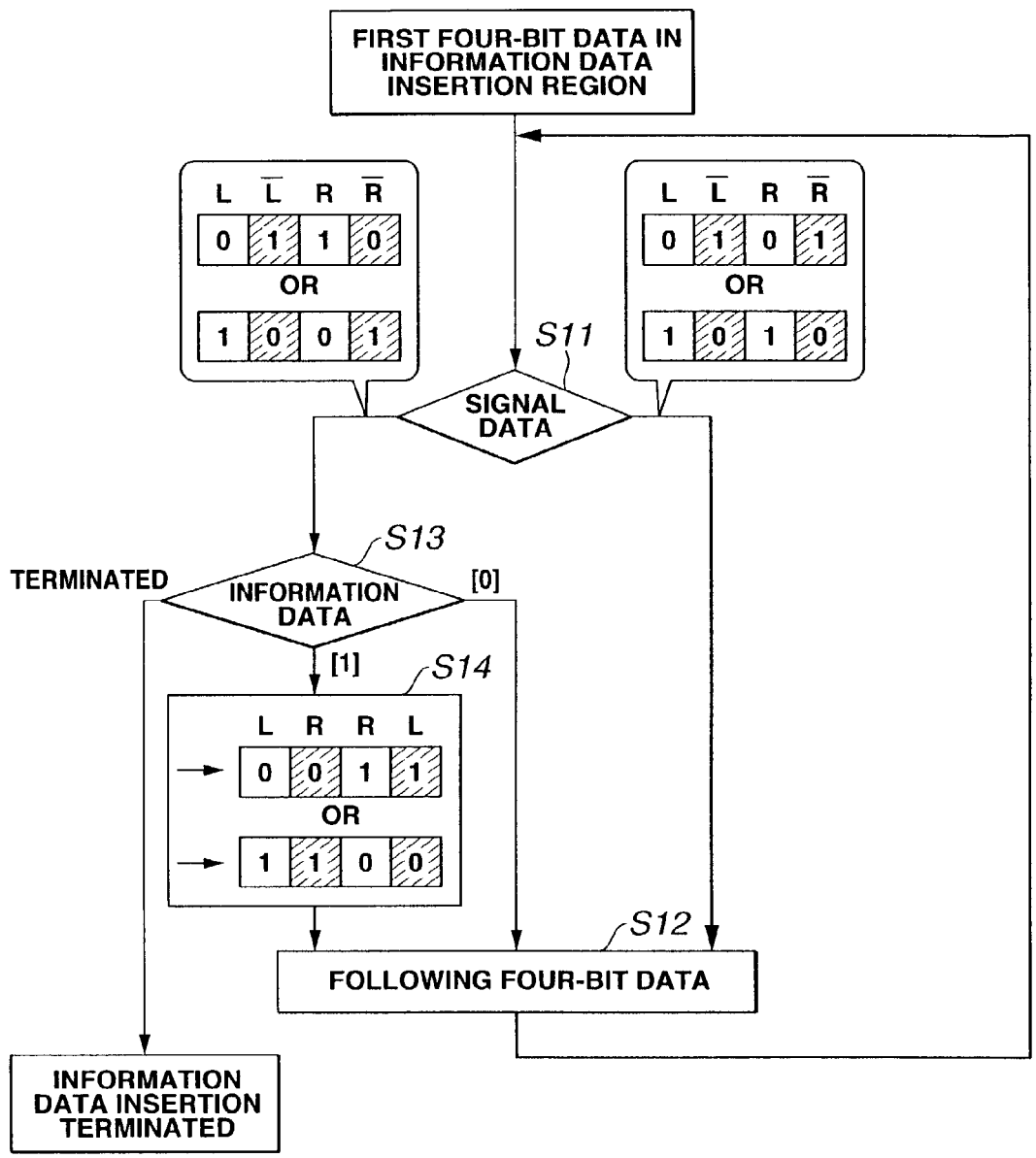
FIG. 7 shows a flow chart for implementing information data insertion shown in FIG. 6.

With reference to FIG. 6 and FIG. 7, insertion of information data by the information data adding unit 11 will be explained. FIG. 6 shows a specific example of the insertion processing in the information data insertion region of the frame shown in FIG. 2, while FIG. 7 shows a flow chart for implementing an algorithm of the information data insertion.

At first, at step S11 in FIG. 7, it is judged whether four kinds of patterns generated by combining the two-bit audio signal data L and R is [L, R]=[0, 0] or [1, 1] otherwise [L, R]=[0, 1] or [1, 0]. At step S11, in case it is determined that the L and R is [L, R]=[0, 0] or [1, 1], the insertion of information data will not be performed and phase-modulated data [L, XL, R, XR]=[0, 1, 0, 1] or [1, 0, 1, 0] which remains intact is output. Next at step S12, this processing will be performed for the following four-bit data, returning to step S11. On the other hand, at step S11, in case it is determined that the L and R is [L, R]=[0, 1] or [1, 0], next at step S13, the processing proceeds to the next step corresponding to the information data, that is, whether the information data is [0] or [1]. That is, in case it is determined that the information data is [0], phase-modulated data [L, XL, R, XR]=[0, 1, 1, 0] or [1, 0, 0, 1] which remains intact is output, proceeding to step S12. On the other hand, in case it is determined that the information data is [1], phase-modulated data [L, XR, R, XL]=[0, 0, 1, 1], [1, 1, 0, 0] is output after inverting the data of inverted phases XL and XR of the L and R channels, respectively, proceeding to step S12. This processing is equal to that of inserting an exclusive OR (XEOR) of the information data and the audio signal data to the information data insertion region. That is, even though the information data is [0], the [0] is converted to a different data pattern in accordance with the original audio signal data. Thus, signals to be transmitted will not be affected by a signal spectrum of the information data to be inserted. Even though the insertion of information data is performed, the numbers of [1]s and [0]s are not changed.

Next, the digital signal decoding apparatus and method according to the present invention will be described. The digital signal decoding apparatus decodes the serial transmission data $D_T$ output from the digital I/O encoder 1 shown in FIG. 1 and transmitted via a transmission line 12, and is configured as a digital I/O decoder 20 shown in FIG. 8.

The digital I/O decoder 20 includes a SYNC signal detector 22 for self-extracting synchronization signals from the serial transmission data $D_T$ supplied via an input terminal 21, an information data detector 23 for detecting the information data from the serial transmission data $D_T$ based on the synchronization signals which are self-extracted by the SYNC signal detector 22, and a signal data detector 24 for detecting audio signal data from the serial transmission data $D_T$ based on the synchronization signals similarly.

The digital I/O decoder 20 further includes an error detector 25 for detecting error contained in the serial transmission data $D_T$ by judging whether the number of [1]s in one frame thereof is equal to that of [0]s or not, a mask circuit 26 for preventing mis-detection of the SYNC signals at the SYNC signal detector 22, a descrambler L 28 for descrambling scrambled L-channel audio signal data contained in the audio signal data detected by the signal data detector 24, a descrambler R 29 for descrambling scrambled R-channel audio signal data contained in the same audio signal data, an error processor L 30, and an error processor R 31.

That is, in the digital I/O decoder 20, the serial transmission data $D_T$ transmitted via the transmission line 12 is supplied to the SYNC signal detector 22, information data detector 23, signal data detector 24, and error detector 25.

The SYNC signal detector 22 detects the SYNC patterns shown in FIG. 3 from the serial transmission data $D_T$ to generate SYNC signals for specifying the frame period. After detecting the SYNC signals, the SYNC correction region is masked by the mask circuit 26 so as to prevent mis-detection of the SYNC signals.

The information data detector 23 receives SYNC signals from the SYNC signal detector 22 and detects information data from the leading portion of the information data insertion region of the serial transmission data $D_T$ to the end of the frame by performing a processing, which will be explained with reference to FIG. 9. Then, detected information data is output as information data I from an output terminal 27 after all the information data is detected.

Figure 9:
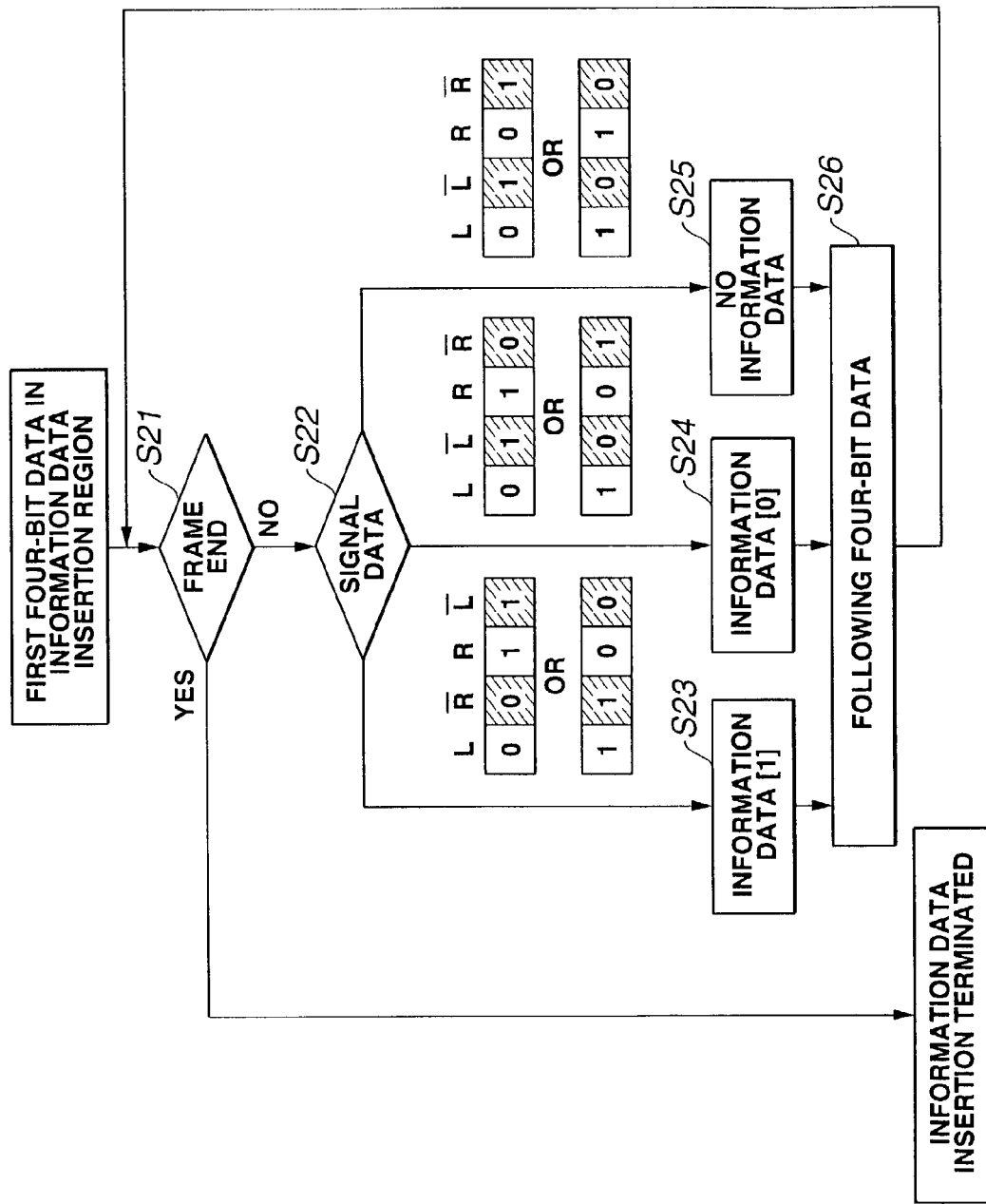
FIG. 9 shows a flow chart for implementing detection of information data inserted by the digital I/O decoder shown in FIG. 8.

FIG. 9 shows a flow chart for implementing an algorithm for detecting the information data I inserted by the digital I/O encoder 1 by employing the information data detector 23. At first, data is read out every four-bit data (one stereo sample) from the leading portion of the information data insertion region. Next, at step S21, it is judged whether the reading out position is the end of the frame or not. That is, in case it is determined that the reading out position is not the end of the frame (No), next at step S22, the processing proceeds to the next steps corresponding to the read out four-bit data. That is, in case the read out four-bit data is [0, 0, 1, 1] or [1, 1, 0, 0], next at step S23, it is determined that the information data is [1]. On the other hand, in case the read out four-bit data is [0, 1, 1, 0] or [1, 0, 0, 1], next at step S24, it is determined that the information data is [0]. On the other hand, in case the read out four-bit data is [0, 1, 0, 1] or [1, 0, 1, 0], next at step S25, it is determined that there is no information data.

After the step S23, step S24, or step S25 is over, the processing proceeds to step S26, at which the following four-bit data will be read out, returning to step S21. This processing will be repeated until the end of the frame is detected.

Since the audio signal data is supplied every other data, the signal data detector 24 can detect the audio signal data by only picking up data of the serial transmission data $D_T$ every other data from the leading portion of each of the frames thereof which is determined by the SYNC signals detected by the SYNC signal detector 22. The L-channel audio signal data is separated from the R-channel audio signal data by distributing alternatively the detected audio signal data every other data. Then, the L-channel audio signal data and R-channel audio signal data is descrambled by the descrambler L 28 and descrambler R 29, respectively, and is supplied to the error processor L 30 and error processor R 31, respectively, and then is output as L-channel one-bit audio signals $A_L$ and R-channel one-bit audio signals $A_R$ from an output terminal 33 and an output terminal 34, respectively.

The error detector 25 receives the SYNC signals from the SYNC signal detector 22, and judges whether the number of [1]s in one frame of the serial transmission data $D_T$ is equal to that of [0]s or not. In case the numbers are not equal to each other, the error detector 25 determines that error is generated in the serial transmission data $D_T$ when the serial transmission data $D_T$ is transmitted via the transmission line 12, and controls the error processor L 30 and error processor R 31 to mute the audio signal data. Furthermore, the error detector 25 examines the number of the same data ranged in succession, and mutes the audio signal data in case the number of the same data ranged in succession is seven or more, determining that there is generated error due to breaking of the transmission line etc.

The determination that the error is generated in the serial transmission data $D_T$ during the transmission via the transmission line 12 is based on the processing that the numbers of [1]s and [0]s in one frame of the serial transmission data $D_T$ are so converted as to be equal to each other. That is, the digital I/O encoder 1 has the function of automatic parity. Furthermore, since the number of the same data which can be ranged in succession is determined in advance, detection of error due to breaking of the transmission line is not difficult. In the present invention, six successive data of the same data, that is, six [1]s or six [0]s at most can be ranged in succession in the SYNC pattern region.

Figure 10:
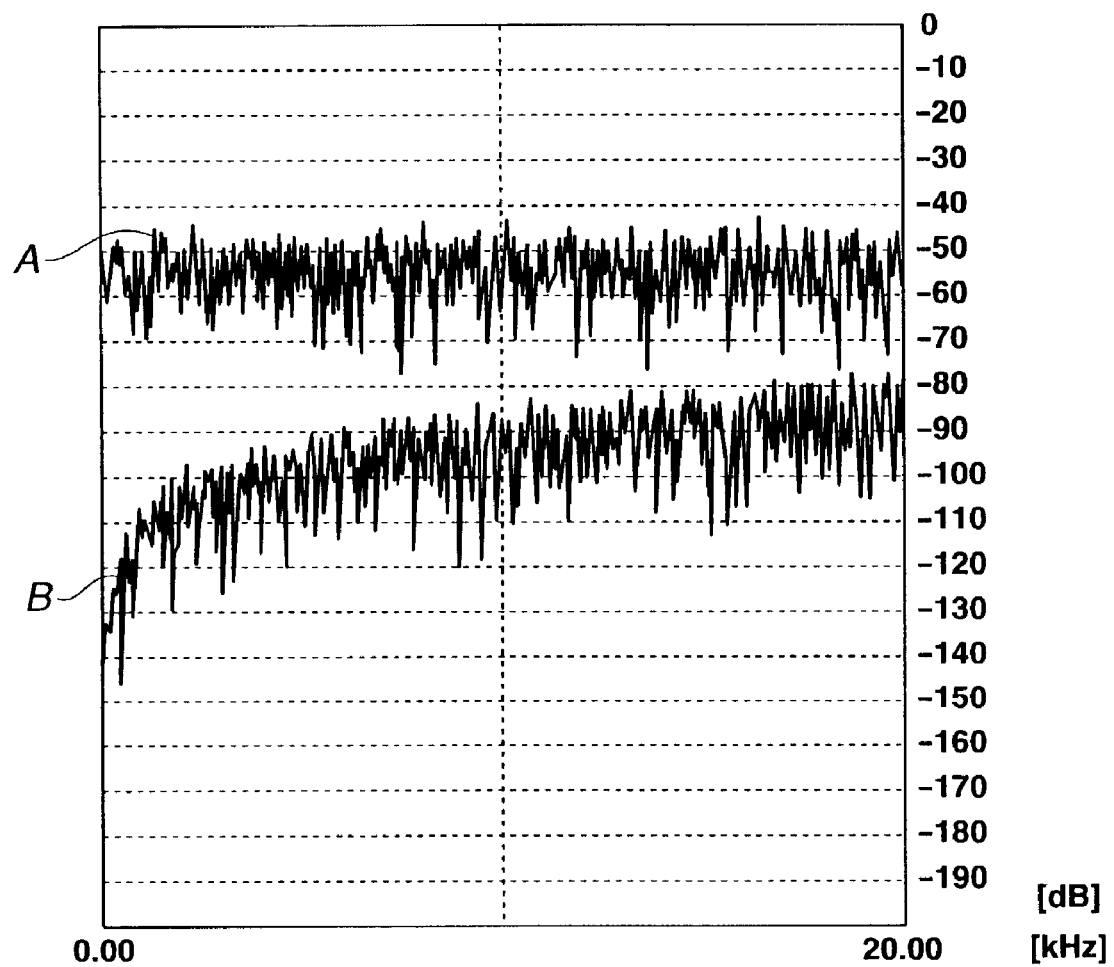
FIG. 10 shows a signal spectrum of modulated serial transmission data.

FIG. 10 shows a signal spectrum of modulated serial transmission data. In FIG. 10, "A" shows the case in which audio signal data is scrambled randomly, while "B" shows the case in which audio signal data is modulated in accordance with the modulating method according to the present invention and the SYNC patterns and information data varying every 1 msec period is inserted thereto. As compared with the case "A" in which the audio signal data is scrambled randomly, as shown in the case "B" employing the modulating method according to the present invention, the signal spectrum can be suppressed to low level in the audio band, while generation of a signal spectrum peculiar to the information data to be inserted can also be suppressed.

Figure 8:
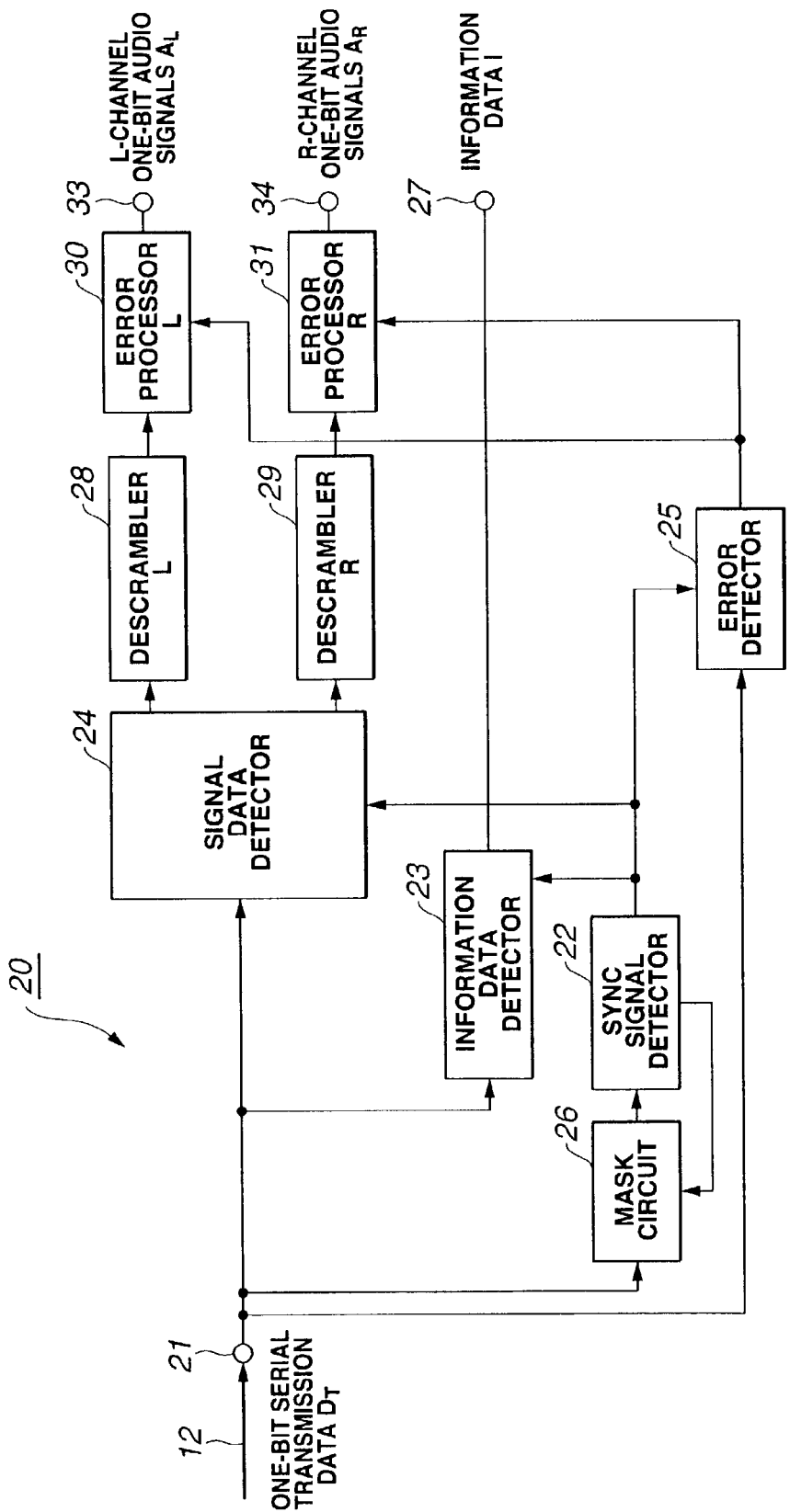
FIG. 8 shows a block diagram of a digital I/O decoder employing the digital signal decoding apparatus according to the present invention.

Furthermore, a digital signal transmitting system can be configured by employing the digital I/O encoder 1 shown in FIG. 1 and the digital I/O decoder 20 shown in FIG. 8.

INDUSTRIAL APPLICABILITY

As in the above, the present invention can implement transmission of digital signals having added there to information data maintaining high signal quality with its data to be transmitted doubled in amount and with audio signal band components suppressed by rearranging data of inverted phases of phase-modulated one-bit signal data.

Since synchronization patterns which cannot exist in phase-modulated one-bit signal data can be added, synchronization signals can be self-extracted, thereby transmission line for transmitting the synchronization signals is not required.

Since the information data and synchronization patterns are added to the phase-modulated one-bit signal data by rearranging the data of inverted phases thereof, original signal data exist every constant samples consecutively in one-bit data stream, thereby the one-bit data stream can be decoded by performing simple sequential processing without affecting decoded original signals.

Furthermore, since the numbers of [1]s and [0]s in one frame of the serial transmission data are so converted as to be equal to each other, the digital I/O encoder has the function of automatic parity.

Furthermore, since the number of the same data which can be ranged in succession is determined in advance, detection of error due to breaking of the transmission line is not difficult.

Furthermore, since the information data is randomized and added to the phase-modulated one-bit signal data, generation of a signal spectrum peculiar to the information data can be suppressed.

The invention claimed is:

1. A digital signal encoding apparatus for encoding one-bit signals of a plurality of n channels, n being equal to at least two, and the one-bit signals being modulated in delta-sigma manner, the apparatus comprising:
   phase modulating means for phase-modulating the one-bit signals as original signals to add data of inverted phases to the one-bit signals; and
   information data adding means for adding information data that are related to the one-bit signals to the phase-modulated one-bit signal data by rearranging the data of inverted phases based on a plurality of m channel units of the n channels, wherein n≧m≧2 and by employing an exclusive OR of the information data and the phase-modulated one-bit signal data.

2. The digital signal encoding apparatus as set forth in claim 1, wherein when the m is equal to 2 and two-bit data of the phase-modulated one-bit signal data is one of 0,1 and 1,0 the information data adding means rearranges the data of inverted phases in accordance with the information data.

3. The digital signal encoding apparatus as set forth in claim 2, wherein when the information data is 1 the information data adding means rearranges the data of inverted phases.

4. A digital signal encoding apparatus for encoding one-bit signals of a plurality of n channels, n being equal to at least two, and the one-bit signals being modulated in delta-sigma manner, the apparatus comprising:
   phase modulating means for phase-modulating the one-bit signals as original signals to add data of inverted phases to the one-bit signals;
   information data adding means for adding information data that are related to the one-bit signals to the phase-modulated one-bit signal data by rearranging the data of inverted phases based on a plurality of m channel units of the n channels, wherein n≧m≧2; and
   synchronization signal adding means for adding independent synchronization patterns that cannot exist in one of the phase-modulating means and the information data adding means by arranging a region of a plurality of samples other than a region to which the information data is added in the phase-modulated one-bit signal data every predetermined period and converting the data of inverted phases in the region in accordance with the phase-modulated one-bit signal data.

5. The digital signal encoding apparatus as set forth in claim 4, further comprising correcting means for making the numbers of one-bit data 1's and one-bit data 0's in the predetermined period that are generated when the synchronization patterns are added by the synchronization signal adding means equal to each other by converting the data of inverted phases in a region of the predetermined period so that a difference between the numbers of 1's and 0's is zero.

6. A digital signal encoding method for encoding one-bit signals of a plurality of n channels, n being equal to at least two, and the one-bit signals being modulated in a delta-sigma manner, the method comprising the steps of:
  phase-modulating the one-bit signals as original signals to add data of inverted phases to the one-bit signals;
  adding information data that are related to the one-bit signals to the phase-modulated one-bit signal data by rearranging the data of inverted phases based on a plurality of m channel units of the n channels, where $n \geq m \geq 2$;
  adding independent synchronization patterns that cannot exist in one of the phase-modulating step and the information data adding step by arranging a region of a plurality of samples other than a region to which the information data are added in the phase-modulated one-bit signal data every predetermined period and converting the data of inverted phases in the region in accordance with the phase-modulated one-bit signal data; and
  making numbers of one-bit data 1's and one-bit data 0's in the predetermined period that are generated when the synchronization patterns are added by the synchronization signal adding step equal to each other by converting the data of inverted phases in a region of the predetermined period such that the difference between the numbers of 1's and 0's is zero.

7. The digital signal encoding method as set forth in claim 6, wherein the information data adding step rearranges the data of inverted phases by employing an exclusive OR of the information data and the phase-modulated one-bit signal data.

8. The digital signal encoding method as set forth in claim 7, wherein when the m is equal to 2 and two-bit data of the phase-modulated one-bit signal data is one of 0,1 and 1,0 the information data adding step rearranges the data of inverted phases in accordance with the information data.

9. The digital signal encoding method as set forth in claim 8, wherein when the information data is 1 the information data adding step rearranges the data of inverted phases.

10. A digital signal decoding apparatus for decoding a one-bit data stream transmitted from a digital signal encoding apparatus that phase-modulates one-bit signals as original signals of a plurality of n channels to add data of inverted phases to the one-bit signals, the one-bit signals being modulated in a delta-sigma manner, and that adds information data that are related to the one-bit signals to the phase-modulated one-bit signal data by rearranging the data of inverted phases based on a plurality of m channel units of the n channels to generate the one-bit data stream, where $n \geq m \geq 2$, the digital signal decoding apparatus comprising:
  synchronization signal detecting means for self-extracting synchronization signals by detecting independent synchronization patterns that cannot exist in the phase-modulating processing and the information data adding processing and that are added by arranging a region of a plurality of samples other than a region to which the information data are added in the one-bit data stream every predetermined period and converting the data of inverted phases in the region in accordance with the phase-modulated one-bit signal data;
  information data detecting means for detecting the information data by judging insertion positions of the data of inverted phases in the one-bit data stream based on the synchronization signals detected by the synchronization signal detecting means; and
  judging means for judging original signal data in the one-bit data stream based on the synchronization signals detected by the synchronization signal detecting means and for detecting the original signal data from leading data of each channel every 2n samples.

11. A digital signal decoding method for decoding a one-bit data stream transmitted from a digital signal encoding apparatus that phase-modulates one-bit signals as original signals of a plurality of n channels to add data of inverted phases to the one-bit signals, the one-bit signals being modulated in a delta-sigma manner, and adds information data that are related to the one-bit signals to the phase-modulated one-bit signal data by rearranging the data of inverted phases based on a plurality of m channel units of the n channels to generate the one-bit data stream, where $n \geq m \geq 2$, the method comprising the steps of:
  self-extracting synchronization signals by detecting independent synchronization patterns that cannot exist in the phase-modulating processing and the information data adding processing and that are added by arranging a region of a plurality of samples other than a region to which the information data is added in the one-bit data stream every predetermined period and converting the data of inverted phases in the region in accordance with the phase-modulated one-bit signal data;
  detecting the information data by judging insertion positions of the data of inverted phases in the one-bit data stream transmitted from a digital signal encoding apparatus based on the synchronization signals detected by the synchronization signal detecting step; and
  judging original signal data in the one-bit data stream transmitted from a digital signal encoding apparatus based on the synchronization signals detected by the synchronization signal detecting step and detecting the original signal data from leading data of each channel every 2n samples.

12. A digital signal transmitting system, comprising:
  a digital signal encoding apparatus that phase-modulates one-bit signals as original signals of a plurality of n channels to add data of inverted phases to the one-bit signals, the one-bit signals being modulated in a delta-sigma manner and that adds information data that are related to the one-bit signals to the phase-modulated one-bit signal data by rearranging the data of inverted phases based on a plurality of m channel unit of the n channels to generate a one-bit data stream, wherein $n \geq m \geq 2$; and
  a digital signal decoding apparatus that self-extracts synchronization signals by detecting independent synchronization patterns included in the one-bit data stream that cannot exist in the phase-modulating processing and in the information data adding processing, and that detects the information data by judging the insertion positions of the data of inverted phases in the one-bit data stream based on the synchronization signals and judges original signal data in the one-bit data stream based on the synchronization signals and detects the original signal data from leading data of each channel every 2n samples.

* * * * *

UNITED STATES PATENT AND TRADEMARK OFFICE
CERTIFICATE OF CORRECTION

PATENT NO. : 7,113,118 B2 Page 1 of 1
APPLICATION NO. : 10/088179
DATED : September 26, 2006
INVENTOR(S) : Masayoshi Noguchi and Gen Ichimura It is certified that error appears in the above-identified patent and that said Letters Patent is hereby corrected as shown below:

Column 1, line 45 "has" should read --have--.
Column 2, line 22 "unit" should read --units--.
Column 2, line 59 "unit" should read --units--.
Column 3, line 18 "unit" should read --units--.
Column 3, line 48 "unit" should read --units--.
Column 4, line 11 "unit" should read --units--.
Column 6, line 17 "is" should read --are--.
Column 8, line 64 "is" should read --are--.
Column 8, line 66 "is" should read --are--.
Column 8, line 67 "is" should read --are--.
Column 12, line 47 "unit" should read --units--.

Signed and Sealed this

Nineteenth Day of June, 2007

JON W. DUDAS
*Director of the United States Patent and Trademark Office*